US012039878B1

(12) United States Patent
Salim et al.

(10) Patent No.: US 12,039,878 B1
(45) Date of Patent: Jul. 16, 2024

(54) SYSTEMS AND METHODS FOR IMPROVED USER INTERFACES FOR SMART TUTORIALS

(71) Applicant: WELLS FARGO BANK, N.A., San Francisco, CA (US)

(72) Inventors: Sadie S. Salim, Mill Valley, CA (US); Dennis E. Montenegro, Concord, CA (US); Rajeswaran Govindan, Livermore, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/812,321

(22) Filed: Jul. 13, 2022

(51) Int. Cl.
G09B 19/00 (2006.01)
G06N 5/022 (2023.01)

(52) U.S. Cl.
CPC ........... G09B 19/003 (2013.01); G06N 5/022 (2013.01)

(58) Field of Classification Search
CPC ................................ G09B 7/00; G09B 19/003
See application file for complete search history.

(56) References Cited

U.S. PATENT DOCUMENTS

| 5,745,738 | A | * | 4/1998 | Ricard | ............... | G09B 19/0053 |
| | | | | | | 434/118 |
| 6,272,396 | B1 | | 8/2001 | Taitler | | |
| 11,011,074 | B2 | | 5/2021 | Inoue | | |
| 11,017,690 | B1 | | 5/2021 | Zia et al. | | |
| 11,170,335 | B2 | | 11/2021 | Bouhini et al. | | |
| 11,216,656 | B1 | | 1/2022 | Zia et al. | | |
| 2011/0111384 | A1 | * | 5/2011 | Dietrich | ................. | A61B 5/18 |
| | | | | | | 434/350 |
| 2011/0256517 | A1 | * | 10/2011 | Swanson | ................ | G09B 19/00 |
| | | | | | | 434/236 |
| 2011/0320240 | A1 | | 12/2011 | Flores et al. | | |
| 2012/0225413 | A1 | * | 9/2012 | Kotranza | ............... | G09B 23/30 |
| | | | | | | 434/262 |
| 2018/0315329 | A1 | * | 11/2018 | D'Amato | ................. | G09B 5/02 |
| 2018/0330306 | A1 | | 11/2018 | Shaw et al. | | |
| 2020/0279205 | A1 | | 9/2020 | Gong et al. | | |
| 2021/0256865 | A1 | * | 8/2021 | Koshiba | ................. | G06F 3/011 |
| 2021/0271886 | A1 | | 9/2021 | Zheng et al. | | |
| 2021/0312829 | A1 | * | 10/2021 | Peterson | ............. | G09B 19/003 |

FOREIGN PATENT DOCUMENTS

| CN | 113240283 A | 8/2021 |
| JP | 2003196681 A | 7/2003 |

* cited by examiner

*Primary Examiner* — Peter R Egloff
(74) *Attorney, Agent, or Firm* — Kilpatrick Townsend & Stockton LLP (57) ABSTRACT

A smart coach computing system receives, from a process site computing device, live feed data of a first user performing a process. The smart coach computing system retrieves a template associated with the process, the template comprising instructions. The smart coach computing system presents, via the process site computing device, the instructions in a stepwise manner based on determining, from the live feed data, completion of each step of the instructions. Upon determining, based on the received live feed data, that the process is complete, the smart coach computing system determines statistics from the live feed data. The smart coach computing system updates the instructions in the template based on the determined statistics.

17 Claims, 4 Drawing Sheets

SYSTEMS AND METHODS FOR IMPROVED USER INTERFACES FOR SMART TUTORIALS

TECHNICAL FIELD

This disclosure generally relates to user interfaces for presenting tutorials. More specifically, but not by way of limitation, this disclosure relates to systems for an improved user interfaces for generating and presenting user tutorials.

BACKGROUND

Conventional approaches for presenting instructions in a tutorial to help a user perform a process generally involve presenting a static list of instructions for a user to follow. Also, conventional approaches for generating tutorials involve receiving inputs via a user interface that manually define steps in the process. For example, an expert user generates a tutorial using a tutorial generation interface by manually defining steps in a process. Further, conventional tutorials are unable to dynamically adapt to situations in which users have difficulty in following instructions. For example, users may have user-specific difficulties with following instructions and conventional approaches are unable to adapt to these user-specific difficulties.

SUMMARY

The present disclosure describes techniques for coaching, by a smart coach computing system, a novice user through a process using live feed data of the novice user performing the process and a process-specific template. For example, a smart coach computing system receives, from a process site computing device, live feed data of a first user performing a process. The smart coach computing system retrieves a template associated with the process, the template comprising instructions. The smart coach computing system presents, via the process site computing device, the instructions in a stepwise manner based on determining, from the live feed data, completion of each step of the instructions. Upon determining, based on the received live feed data, that the process is complete, the smart coach computing system determines statistics from the live feed data. The smart coach computing system updates the instructions in the template based on the determined statistics.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

In the following description, for the purposes of explanation, specific details are set forth in order to provide a thorough understanding of certain embodiments. However, it will be apparent that various embodiments may be practiced without these specific details. The figures and description are not intended to be restrictive. The words "exemplary" or "example" are used herein to mean "serving as an example, instance, or illustration." Any embodiment or design described herein as "exemplary" or "example" is not necessarily to be construed as preferred or advantageous over other embodiments or designs.

Certain embodiments described herein address the limitations of conventional systems by providing a system to interactively coach a novice user through a process using live feed data of the novice user performing the process and a process-specific template Certain embodiments described herein improve the performance of conventional tutorial generation systems by, for example, applying a machine learning model to live feed data of an expert user performing the process to generate customized instructions for the tutorial as well as conditional instructions for situations in which mistakes or other deviations from the instructions occur. This machine learning based modification to the tutorial based on live feed data enables the tutorial to dynamically adapt to user-specific difficulties in performance of the process. Also, certain embodiments described herein improve user interfaces for generating tutorials by, for example, automatically modifying, via machine learning based predictions, instructions in a tutorial based on statistics determined from live feed data of a user performing the process logged by a process site computing device.

The following non-limiting example is provided to introduce certain embodiments. In certain embodiments, a smart coach computing system can guide the novice user through a process (e.g., a process for opening a shop) by providing, via the process site computing device, instructions based on a process-specific template trained by an expert user. Providing the instructions can include presenting via a display screen, outputting sound outputs via a speaker component, or providing other outputs of the process site computing device and/or devices communicatively coupled to the process site computing device (e.g., via a wearable device). For example, the expert user is a store owner and trains the smart coach computing system to provide instructions to open the shop one or more store employees, who are novice users. For example, instructions for opening the shop include entering a key number, turning on lights and specific equipment, and setting up a cash register. The smart coach computing system receives live feed data (e.g., video data, image data, audio data, or other data) from the process site computing device and/or from one or more devices communicatively coupled to the process site computing device and presents the instructions as the live feed data indicates a progress of the novice user in performing the process. For example, as the live feed data indicates that the user completes a step of the instructions, the smart coach computing system presents a next step of the instructions via the process site computing device.

In certain embodiments, based on live feed data from a process site computing device monitoring a novice user's performance of the process, the smart coach computing system can detect deviations from the instructions and/or mistakes of the novice user and modify the instructions presented to the novice user. For example, the smart coach computing system, based on the live feed data (e.g., temperature data received from an oven, a video including an image of a temperature dial or display on the oven), determines that the user has increased the oven temperature five degrees too high from a temperature specified in the instructions in the process-specific template and outputs, via the process site computing device, a corrective instruction to reduce the oven temperature by five degrees.

In certain embodiments, the smart coach computing system transmits an alert to a user computing device associated with the expert user alerting the expert user to the deviation and/or mistake of the novice user. For example, the live feed data (e.g., via image frames within a video, via an alarm status data received from a smart smoke detector communicatively coupled to the process site computing device) indicates that the oven is emitting smoke and smoke is filling the process site. The smart coach computing system, in this example, determines that the current conditions necessitate sending an alert and the smart coach computing system transmits an alert to a computing device of the expert user alerting the expert user to the current conditions (a potential fire hazard). In certain examples, the smart coach computing system may alert other systems, for example, a first responders' system (e.g., fire department, police department, security agency, etc.) responsive to detecting that these current conditions necessitate sending an alert.

In certain embodiments, the smart coach computing system determines, based on the live feed data, that the process is complete and determines statistics based on the live feed data and, in some instances, updates the instructions associated with the process-specific template. For example, statistics could include a total time that it took the novice user to complete the process, a time that it took to complete each step of the instructions, an image of a final result of the process (e.g., an image of baked muffins cooling on a rack), a number of instances in which the novice user deviated from the instructions in the tutorial, or other statistics associated with the process. In certain examples, the smart coach computing system outputs modified instructions to attempt to minimize one or more statistics (e.g., minimize a number of deviations from the instructions, minimize a total amount of time for completing the process). Accordingly, the smart coach computing system can improve the instructions based on the statistics determined from the live feed data. In some examples, the smart computing system updates one or more machine learning models used to generate corrective and/or supplemental instructions based on the statistics determined from the live feed data upon completion of the process. In some instances, the smart coach computing system presents, via the process site computing device, the improved instructions at a subsequent time to the novice user and/or to other novice users attempting to perform the process.

Figure 1:
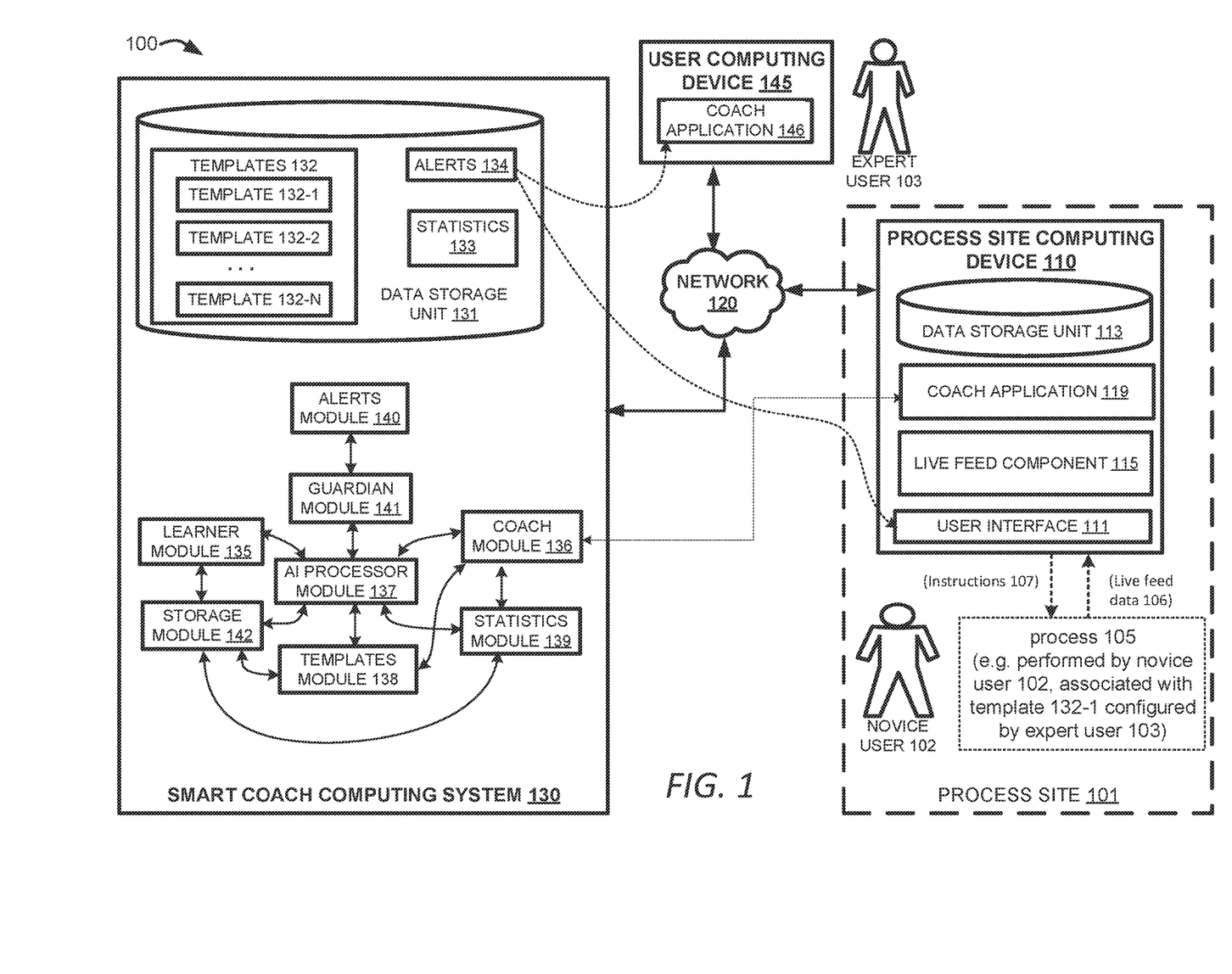
FIG. 1 depicts an example of a computing environment for coaching, by a smart coach computing system, a novice user through a process using live feed data of the novice user performing the process and a process-specific template, according to certain embodiments disclosed herein.

Example Operating Environment for Coaching, by a Smart Coach Computing System, a Novice User Through a Process Using Live Feed Data and a Process-Specific Template Referring now to the drawings, FIG. 1 depicts an example of a computing environment 100 for coaching, by a smart coach computing system, a novice user through a process using live feed data of the novice user performing the process and a process-specific template, in accordance with certain embodiments. The computing environment 100 includes a process site computing device 110 and a smart coach computing system 130. In some embodiments, the computing environment includes a user computing device 145.

In certain embodiments, the process site computing device 110 includes a user interface 111, a data storage unit 113, a microphone component 115, a camera 117, a speaker 118, and a coach application 119.

The user interface 111 enables a user (e.g., a novice user 102 and/or an expert user 103) to interact with the process site computing device 110. The user interface 111 may be a touch screen interface, a voice-based interface, a viewer interface such as a camera, to show side by side what the novice user is doing compared to the instructions 107, or any other interface that allows users to provide input and receive output from one or more applications on the process site computing device 110. Users of the process site computing device 110 may interact with the coach application 119 via the user interface 111. In an example, the expert user 103 interacts via the user interface 111 with the coach application 119 to configure a template 132 (e.g., template 132-1) associated with a particular process 105 (e.g., baking bread, opening/closing up the shop, etc.) to be performed by one or more novice users 102. In an example, the novice user 102 interacts via the user interface 111 with the coach application 119 to select the particular process 105 from a list of processes so that the novice user 102 can receive feedback during performance of the process 105 in accordance with the template 132-1. In certain embodiments, the user interface 111 displays (e.g., via a display screen), outputs audio (e.g., via a speaker device) or otherwise communicates instructions 107 to a novice user 102 to aid in performing a process 105 associated with a particular template 132-1.

The data storage unit 113 can be a local or remote storage device or other memory suitable for storing information and accessible to the process site computing device 110. In an example, the data storage unit 113 stores encrypted information. In certain embodiments, the data storage unit 113 may be implemented in a secure element or other secure memory (not shown) on the process site computing device 110. In other embodiments, the data storage unit 113 may be a separate memory unit resident on the process site computing device 110. The data storage unit 113 may be accessible to the coach application 119 and store templates 132 (e.g., N templates 132: template 132-1, template 132-2, . . . template 132-N) generated by the smart coach computing system 130, where each of the templates 132 is associated with respective process 105. These templates are available for a wide array of industries and in multiple languages. In some instances, pricing for templates can vary based on levels of specificity and granularity of the instructions 107 associated with the template 132. In some embodiments, as customers create variations and improvements on the template instructions, the variations/improvements can be fed back to the template 132 (with consent by and possible compensation to the customers). For example, the variations or improvements can be for private use or made available to the vendor to vet, approve, and perhaps provide compensation. Templates 132 can include, in the instructions 107, interventions. For example, interventions can include steps by which the system will intervene and remediate in case the novice user 102 makes mistakes.

In certain embodiments, the process site computing device 110 receives, via a live feed component 115, live feed data 106 while the novice user 102 and/or the expert user 103 is performing a process 105. The live feed data 106, in some instances, can include sound inputs, images and/or video inputs, accelerometer data and/or positioning data of the process site computing device 110, data describing conditions of the process site 101 (e.g., status of a smoke detector, a current temperature, opened/closed status of windows or doors). For example, the live feed component 115 could include a microphone component able to receive live feed data 106 in the form of sound inputs in an environment of the process site computing device 110 (e.g., sounds inputs from the process site 101 resulting from a user performing a process 105). For example, the microphone component detects vibrations in the process site 101 environment and converts the vibrations into electrical signals and stores the sound input as a file (e.g., a way file or other audio file). In some instances, the live feed component 115 includes a camera module able to receive live feed data 106 in the form of image and/or video inputs in an environment of the process site computing device 110 (e.g., image and/or video inputs from the process site 101 resulting from a user performing a process 105). In some instances, the live feed component 115 includes an accelerometer that logs live feed data 106 in the form of a current acceleration of the process site computing device 110. In some instances, the live feed component 115 includes a gyroscope that logs live feed data 106 in the form of an angular velocity of the process site computing device 110.

In some embodiments, the live feed component 115 is communicatively coupled to one or more other devices located at the process site 101 separate from the process site computing device 110. The one or more other devices can include cameras, microphone devices, beacon devices, security devices (e.g., smoke detector, door and window monitors), smart appliances (e.g., stoves, refrigerators, etc.), user computing devices (mobile phone, tablet devices, etc.), smartwatches or other wearable devices, or other devices that are able to log live feed data 106 and the live feed component 115 receives live feed data 106 from these one or more other devices. The live feed component 115, in some instances, receives live feed data 106 from these other devices in the form of image data, video data, audio data, accelerometer data, positioning data (e.g., GPS coordinates), environmental conditions data (e.g., temperature recorded by thermometer, presence of smoke detected by smoke detector), security status data (opened/closed and/or locked/unlocked status of doors and/or windows), computing device operation status (e.g., which application or program is operating, which user interface objects are being selected within an application or program), or other live feed data 106. Live feed data 106 can include any data detected, received, or otherwise logged in the process site environment 101 while a user (e.g., novice user 102 or expert user 103) is performing a process 105.

The live feed component 115 communicates the live feed data 106 to the coach application 119 and/or to the smart coach computing system 130 (e.g., to the coach module 136) via the network 120.

The coach application 119 is a program, function, routine, or similar entity that exists on and performs its operations on the process site computing device 110. The coach application 119 may be associated with the smart coach computing system 130. For example, a user (e.g., the expert user 103) of the smart coach computing system 103 may access, via the process site computing device 110 over the network 120, a website of the smart coach computing system 130 and download the coach application 119. The coach application 119 may communicate with the smart coach computing system 130 via the network 120. The coach application 119 may receive live feed data 106 via a microphone component 115, a camera 117, and/or other live feed data input components (e.g., via an accelerometer component, a gyroscope, a light detector, a temperature detector, etc.). The coach application 119 may receive, via the user interface 111, an input of the novice user 102 indicating a selection of a template 132 associated with a process 105 to be performed by the novice user 102. The coach application 119 may display or otherwise output, via the user interface 111, instructions to perform the process 105 in accordance with the template 132. The coach application 119 may modify the instructions 107 and/or provide supplemental instructions 107 based on the received live feed data 106 of the novice user 102 performing the process 105 at the process site 101.

In certain embodiments, the smart coach computing system 130 is a network server or other computing device connected to a network 120. In certain embodiments described herein an expert user 103 associated with a user computing device 145 and the process site computing device 110 has an account with the smart coach computing system 130. In certain embodiments, the smart coach computing system 130 communicates with the processing site computing device 110 via the network 120. The smart coach computing system 130 may communicate, via the network 120, with the user computing device 145 via the network 120. For example, the user computing device 145 is associated with the expert user 103 and the expert user 103 can access an account with the smart coach computing system 130 using the user computing device 145.

In certain embodiments, the smart coach computing system 130 includes a data storage unit 131, a learner module 135, a coach module 136, an artificial intelligence (AI) processor module 137, a templates module 138, a statistics module 139, an alerts module 140, a guardian module 141, and a storage module 142.

In certain embodiments, the smart coach computing system 130 is a component of, and operates on, the process site computing device 110. In certain embodiments, one or more of the data storage unit 131, the learner module 135, the coach module 136, the AI processor module 137, the templates module 138, the statistics module 139, the alerts module 140, and a guardian module 141.

The data storage unit 131 may comprise a local or remote storage device or other memory suitable for storing information and accessible to the smart coach computing system 130. For example, the data storage unit 131 could be a component of the smart coach computing system 130 and/or a component of the process site computing device 110. In an example, the data storage unit 131 stores encrypted information. The smart coach computing system 130 may generate templates 132 associated with processes 105 based on inputs received from an expert user 103 and store the templates 132 (e.g., templates 132-1, 132-2, . . . 132-N) in the data storage unit 131. The smart coach computing system 130 may determine, using the statistics module 139, statistics 133 associated with performance of a particular process 105 (e.g., associated with a particular template 132-1) and store the statistics 133 in the data storage unit 131. Further, the data storage unit 131 may store alerts 134 associated with one or more templates 132 so that, when a novice user 102 performs an action that triggers an alert 134, the alerts module 140 can alert the novice user 102 via the process site computing device 110 and/or alert the expert user 102 via the user computing device 145.

In certain embodiments, the smart coach computing system 130 comprises a storage module 142 which manages storage of data in the data storage unit 131. The storage module 142 can store all data generated by various modules (e.g., modules 135, 136, 137, 138, 139, 140, and 141) in the data storage unit 131 to be used by the various modules as needed.

In certain embodiments, the storage module 142 retrieves data from the data storage unit 131 responsive to receiving a request from one of the other modules (e.g., modules 135, 136, 137, 138, 139, 140, and 141) of the smart coach computing system 130. In certain embodiments, the storage module 142 stores AI models which are applied by the AI processor module 137 to live feed data 106 (or data determined therefrom) to generate predictions or other outputs. The storage module 142 may also store statistics 133 generated by the statistics module 139. In certain examples, the storage module 142 communicates data to the AI processor module 137, the templates module 138, and the statistics module 139 and receives data from the learner module.

In certain embodiments, the learner module 135 communicates with the process site computing device 110 to receive live feed data 106 of the expert user 103 performing a process 105 at the process site 101. The learner module 135 may interpret the live feed data 106 by recording time passage (e.g., logging time stamps) and recording spatial, verbal, and visual information as it observes how the expert user 103 performs the process 105 at the process site 101. The learner module 135 communicates its time passage and spatial, verbal, and visual information to the AI processor module 137 for further processing and/or to the storage module 142 for storage on the data storage unit 131. In certain embodiments, the learner module 135 is a component of the process site computing device 110 that intakes the live feed data 106 and the learner module 135 transmits its time passage and spatial, verbal, and visual information to the smart coach computing system 130, for example, to the AI processor module 137. The learner module 135 may communicate with the storage module 142 to store the live feed data 106. The learner module 135 also can communicate with the expert user 103 and/or novel user 102 to receive live feed data 106 or other input.

The coach module 136 provides instructions 107 to a novice user 102 instructing how to perform a process 105 associated with a particular template of a set of process-specific templates 132 (e.g., templates 132-1, 132-2, . . . 132-N). The coach module 136, in some instances, outputs instructions 107 for display via the user interface 111. In some instances, the instructions 107 include video/image and sound output (e.g., verbal instructions). The instructions 107 provided by the coach module 136 are interactive and not only instruct the novice user 102 through each step of the process 105 but also provide instructions 107 to the novice user 102 to correct any mistakes, based on instructions received from the AI processor module 137 and/or the templates module 138. In certain embodiments, the process site computing device 110 comprises a wearable device, a 2D/3D display device, or a virtual/augmented reality device (or is communicatively coupled to such a device) and the instructions 107 include a projection of a map of the process 105 being performed combined with a map of movement of the novice user 102 on a display screen. In certain embodiments, the coach module 136 gathers live feed data 106 and transmits the live feed data 106 to one or more modules for further processing. In some instances, the coach module 136 transmits the live feed data 106 to the storage module 142 for storage in the data storage unit 131. In certain examples, the coach module 136 can receive input from the AI processing module 137, the templates module 138, the statistics module 139, and the novice user 102 and can provide output to the AI processing module 137, templates module 138, statistics module 139, and the novice user 102.

The artificial intelligence (AI) processor module 137 uses the data in the data storage unit 131 (e.g., accessed by the storage module 142) and a layout and flow associated with a process-specific template 132 to generate instructions 107 to be provided via the coach module 135 to the novice user 102. For example, the instructions 107 may comprise a visual based, auditory based, spatial based, and/or time-based presentation to guide the novice user 102 through the process 105 associated with a template 132. The AI processor module 137 may employ different levels of sophistication in generating the instructions 107. For example, the instructions 107 may comprise generating a video or instructing the novice user 102 through steps of the process 105 and providing the novice user 102 with instructions to correct mistakes if the smart coach system 130 detects a mistake of the novice user 102 while completing the process 105. In certain embodiments, the AI processor module 137 transmits the instructions 107 and/or modifications to the instructions 107 to the coach module 135 for presentation to the novice user 102 via the process site computing device 110. The AI processor module 137 can receive input from the learner module 135, the storage module 142, the templates module 138, the statistics module 139, the coach module 136, and the guardian module 141 and can provide output to the learner module 135, the storage module 142, the templates module 138, the statistics module 139, the coach module 136, and the guardian module 141.

The templates module 138 generates templates 132 associated with processes 105. For example, each of N templates 132 (e.g., template 132-1, template 132-2, . . . , template 132-N) generated by the templates module 138 is associated with a respective process of a set of N processes 105. The templates module 138 communicates with the storage module 142 to store generated templates 132. In certain examples, templates 132 can be customized for different scenarios. For example, template 132-1 could be associated with a process 105 to make blueberry muffins as well as a variant process 105 to make low sugar blueberry muffins, while template 132-2 could be associated with a process 105 for baking bread. In certain examples, the templates module 138 updates a template 132 responsive to receiving instructions from the AI processor module 137. In certain examples, the templates module 138 transmits a template 132 to the coach module 136 responsive to receiving a request from the coach module 136. In certain examples, the templates module 138 operates on the process site computing device 110. In certain embodiments, the templates module 138 can receive input from the storage module 142, the AI processor module 137, and the coach module 136 and can provide output to the storage module 142, the AI processor module 137, and the coach module 136.

The statistics module 139 provides a forecasted accuracy of the model to the novice user 102 when the novice user 102 starts the coach module 132. For example, the forecasted accuracy is an accuracy of how the process was performed over time in past attempts. In some instances, the novice user 102 is given a measure of accuracy after he/she completes the instructions 107 (e.g. the image accuracy on cupcake surface is 95% for instructions 107 for preparing cupcakes). The statistics module 139 determines whether additional training is required by the learner module 135 to improve the model. The statistics module 139 compares actions and data received from the learner module 135 and/or the coach module 136 and determines statistics 133 based on the received actions and data. In certain examples, the statistics module 139 can receive input from the storage module 142, the AI processor module 137, and the coach module 136 and provide output to the storage module 142, the AI processor module 137, and the coach module 136.

The alerts module 140, in certain embodiments, provides a status of the process 105 being performed by the novice user 102 to the user computing device 145 associated with the expert user 103. For example, the alerts module 140 can send a text message (SMS), email, phone call, or other means to communicate an alert 134 to the user computing device 145. In some instances, the user computing device 145 includes a coach application 141 and the alerts module 140 transmits an alert 134 to the coach application 141. The alerts module 140 transmits an alert 134 to the user computing device 145 responsive to receiving a request to transmit the alert 134 from the guardian module 141. In certain embodiments, transmitting the alert 134 includes using pre-defined configuration files and a cascading process to alert concerning performance of the process 105 by the novice user 102. For example, the cascading process comprises sending alerts 134 of increasing intensity until a response from the expert user's 103 user computing device 145 is received. For example, first an email is sent, followed by a text message, followed by a text message accompanied with a vibration or sound output, followed by a phone call, etc. In some instances, the alerts module 140 receives from the user computing device 145, a response to the alert 134 and communicates the response to the guardian module 141. The alert can include a request for the expert user to elaborate on a specific step being demonstrated. In certain examples, the alerts module 140 can receive inputs from the guardian module 141 and can provide output to the novice user 102 and/or to the expert user 103.

The guardian module 141 monitors the novice user's 102 performance of the process 150 based on live feed data 106 gathered and processed by the coach module 136. In certain examples, the guardian module 141 is trained by the learner module 135 to recognize situations that require sending an alert 134. For example, during training, the expert user 103 performs the process 105 and also explains and/or demonstrates to the learner module 135 which situations require an alert 134 and also what to do in situations that require an alert 134. When the guardian module 141 recognizes a situation that requires sending an alert 134, the guardian module 141 transmits a request to the alerts module 140 to send an alert 134 to the user computing device 145 associated with the expert user 103. In certain examples, the guardian module 141 can receive input from one or more of the expert user 103 and the novice user 102 and can provide output to one or more of the AI processor module 137 or the alerts module 140.

The smart coach computing system 130 (including the learner module 135, the coach module 136, the AI processor module 137, the templates module 138, the statistics module 139, the alerts module 140, the guardian module 141, and the storage module 142) may be implemented using software (e.g., code, instructions, program) executed by one or more processing units (e.g., processors, cores), hardware, or combinations thereof. The software may be stored on a non-transitory storage medium (e.g., on a memory device). The computing environment 100 depicted in FIG. 1 is merely an example and is not intended to unduly limit the scope of claimed embodiments. One of the ordinary skills in the art would recognize many possible variations, alternatives, and modifications. For example, in some implementations, the smart coach computing system 130 (including the learner module 135, the coach module 136, the AI processor module 137, the templates module 138, the statistics module 139, the alerts module 140, the guardian module 141, and the storage module 142) can be implemented using more or fewer systems or subsystems than those shown in FIG. 1, may combine two or more subsystems, or may have a different configuration or arrangement of the systems or subsystems.

In certain embodiments, the user computing device 145 includes a coach application 119. In certain embodiments, the user computing device 145 is associated with an expert user 104 who configures a template 132 associated with a process 105. When the expert user 103 is away from the process site 101, a novice user 102 attempts to perform the process 105 and is guided through the process 105 by the process site computing device 110. The user computing device 145 may receive, from the smart coach computing system 130, one or more of statistics 133 and/or alerts 134 associated with performance of the process 105 by the novice user 102. In certain embodiments, the user computing device 145 further includes a user interface and a data storage unit. For example, the expert user 103 can view, via the user interface, statistics 133 and/or alerts 134 received by the user computing device 145 from the smart coach computing system 130. Also, the user computing device 145 can store, via the data storage unit, the statistics 133 and/or alerts 134 received by the user computing device 145 from the smart coach computing system 130.

Figure 2:
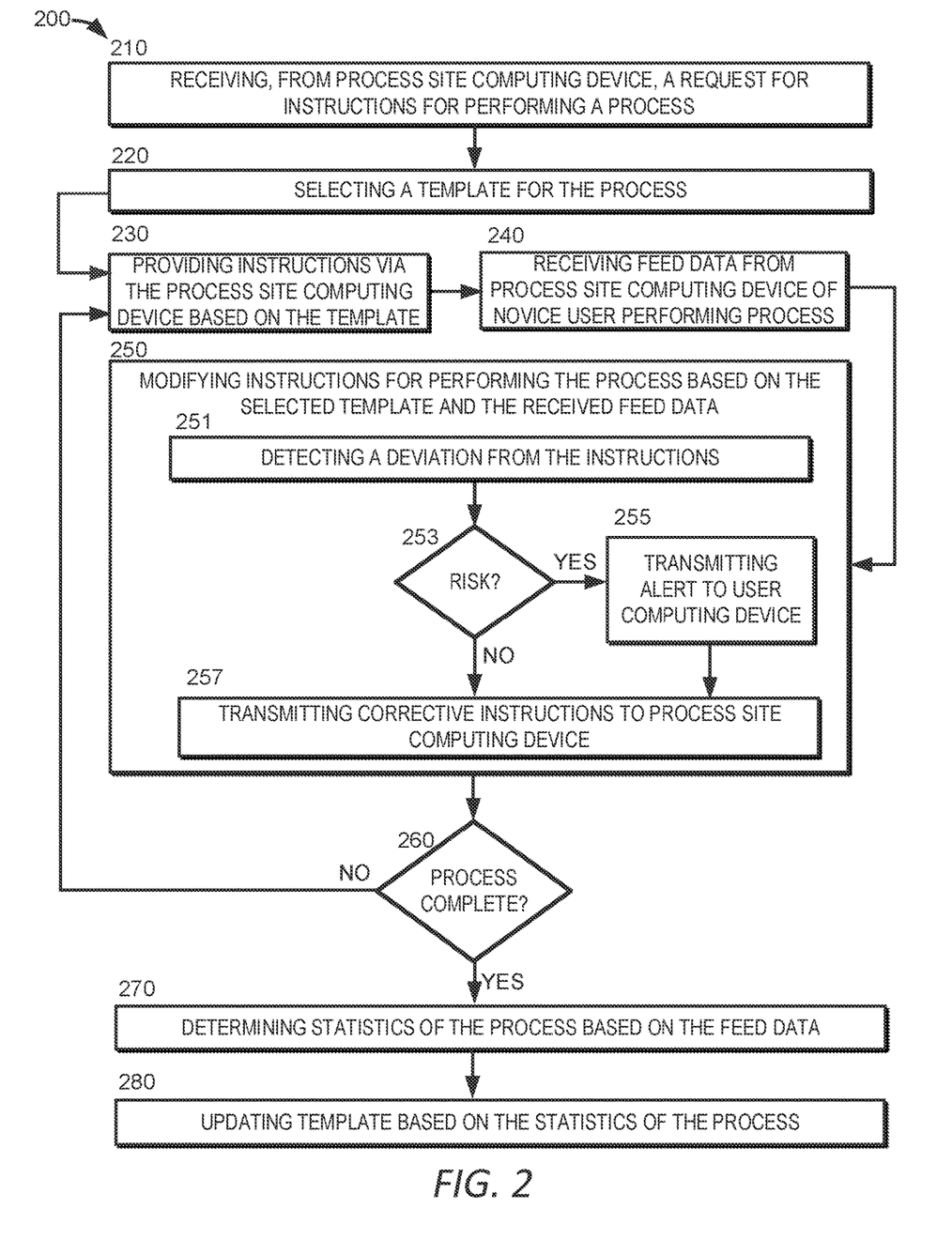
FIG. 2 depicts an example of a process for coaching, by a smart coach computing system, a novice user through a process using live feed data of the novice user performing the process and a process-specific template, according to certain embodiments disclosed herein.

Examples of Computer-Implemented Operations for Coaching a Novice User Through a Process Based on Live Feed Data of the User Performing the Process and a Process-Specific Template FIG. 2 depicts an example of a process 200 for coaching, by a smart coach computing system 130, a novice user 102 through a process using live feed data 106 of the novice user 102 performing the process 105 and a process-specific template 132. One or more computing devices (e.g., smart coach computing system 130 or the individual modules contained therein) implement operations depicted in FIG. 2. For illustrative purposes, the process 200 is described with reference to certain examples depicted in the figures. Other implementations, however, are possible.

In the examples described herein, the smart coach computing system 130 is separate from the process site computing device 110 and communicates with the process site computing device 110 via the network 120. However, in other embodiments, the process site computing device 110 performs one or more operations described herein as performed via the smart coach computing system 130. In some embodiments, all operations described herein as being performed by the smart coach computing system 130 are performed via the process site computing device 110.

In certain examples, the smart coach computing system 130 can guide the novice user 102 through a process 105 by providing, via the process site computing device 110, instructions 107 based on a process-specific template 132 trained by an expert user 103. For example, the expert user 103 is a store owner and trains the smart coach computing system 130 to provide instructions 107 to one or more store employees, who are novice users 102. In certain examples, based on live feed data 106 from a process site computing device 110 monitoring a novice user's 102 performance of the process 105, the smart coach computing system 130 can detect deviations from the instructions 107 and/or mistakes of the novice user 102 and modify the instructions 107 presented to the novice user 102. In some instances, the smart coach computing system 130 transmits an alert 134 to a user computing device 145 associated with the expert user 103 alerting the expert user 103 to the deviation and/or mistake of the novice user 102. In certain examples, the smart coach computing system 130 determines, based on the live feed data 106, that the process 105 is complete and determines statistics based on the live feed data 106 and, in some instances, updates the instructions 107 associated with the process-specific template 132.

At block 210, the method 200 involves receiving, by the smart coach computing system 130, a request for instructions 107 for performing a process 105. In some embodiments, a novice user 102 (e.g., an employee of a store) inputs the request to the process site computing device 110, for example, by selecting the process 105 using the user interface 111 of the process site computing device 110. For example, the process site computing device 110 displays a list of a set of processes 105 and the novice user 102 selects the process 105 from the list of the set of processes 105. Responsive to receiving the selection of the process 105, the process site computing device 110 transmits the request for instructions 107 to the smart coach computing system 130 via the network 120. In some embodiments, the smart coach computing system 130, instead of receiving an explicit request for instructions 107, detects that the novice user is already performing the process 105. For example, the smart coach computing system 130 receives, from the process site computing device 110, live feed data 106 of the novice user 102. In an example, the novice user 102 has begun baking bread and the smart coach computing system 130 applies a machine learning model (e.g., via the AI processor module 137) to predict that the novice user 102 is performing a bread baking process 105.

At block 220, the method 200 involves selecting, by the smart coach computing system 130, a template 132 associated with the process 105. For example, the smart coach computing system 130 receives (e.g., using the coach module 136) a selection of the process 105 from the process site computing device 110 or otherwise determines (e.g., using the AI processor module 137) that the novice user 102 is performing the process 105 and selects (using the templates module 138) from the data storage unit 131, a template 132 associated with the process 105 from a set of templates 132 stored on the data storage unit 131. For example, the set of stored templates 132 include a template 132-1 associated with a process 105 of baking muffins and a template 132-2 associated with a process 105 of baking bread and the smart coach computing system 130 selects template 132-1 based on receiving a selection of the process 105 of baking muffins or determining, based on received live feed data 106, that the novice user 102 is performing the process 105 of baking muffins. The selected template 132 (e.g., template 132-1) includes a set of instructions 107 associated with the process 105. For example, the instructions 107 associated with a process 105 for making muffins include instructions 107 for which ingredients to use, how much of each of the ingredients, which containers to use, what actions to take, how to mix the ingredients, when to place the mixture in the oven, how long to leave the mixture in the oven, what conditions to check before taking the product out of the oven, how to cool the product, and how to display the product. In certain examples, the instructions 107 include sets of alternative instructions 107, for example, the instructions 107 for making muffins enable varieties of muffins (e.g., blueberry, strawberry, chocolate, etc.) to be made via variations of ingredients and steps in the instructions 107. In another example, the instructions 107 are for a process 105 of opening a shop. For example, the instructions 107 associated with a process 105 of opening a shop include key number entry, turning off an alarm, turning on lights and specific equipment, setting up a cash register, and other actions to be performed at the shop (e.g., at the process site 101).

Figure 3:
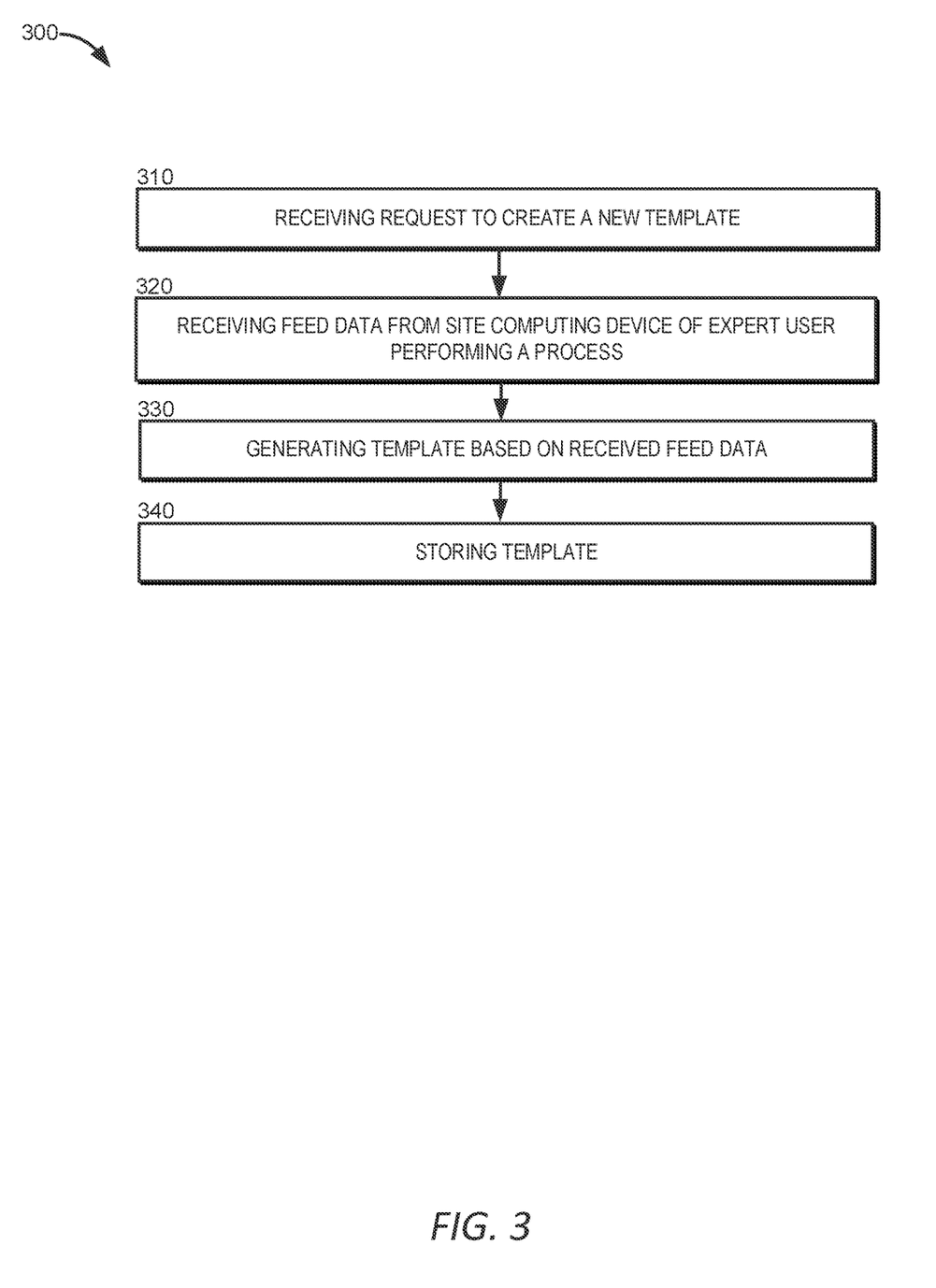
FIG. 3 depicts an example of a process for generating, by a smart coach computing system, a process-specific template based on live feed data of an expert user performing a process, according to certain embodiments disclosed herein.

At block 230, the method 200 involves providing, by the smart coach computing system 130, instructions 107 via the process site computing device 110 based on the template 132. In some instances, the process site computing device 110 presents the instructions 107 via the user interface 111. In some instances, the process site computing device 110 displays the instructions 107 via a display screen of the process site computing device 110 and/or one or more display screens communicatively coupled to the process site computing device 110. In some instances, the process site computing device 110 outputs, via a speaker component of the process site computing device 110 or via one or more speaker components communicatively coupled to the process site computing device 110, audio instructions 107. Presenting the instructions 107 can also include providing vibratory outputs, light outputs, or other outputs of the process site computing device 110 or of computing devices communicatively coupled to the process site computing device 110 (e.g., via a wearable device). In some instances, the instructions 107 include raw and/or processed live feed data 106 of the expert user 103 performing the process 105. FIG. 3 describes a method for a smart coach computing system 130 to train a process-specific template 132 associated with a process 105 based on live feed data 106 of an expert user 103 performing the process 105. Training the process-specific template 132 can include generating the instructions 107 for performing the process 105.

Blocks 240 and 250 involve modifying, as necessary, the instructions 107 based on live feed data 106 of the novice user 102 performing the process 105. In certain embodiments, blocks 240 and 250 are performed, along with block 230 (providing the instructions 107) continuously and simultaneously. For example, the smart coach computing system 130 continuously receives live feed data 106 from the process site computing device 110 and modifies, as necessary, the instructions 107 based on the received live feed data 106 and presents the modified instructions.

At block 240, the method 200 involves receiving, by the smart coach computing system 130, live feed data 106 from the process site computing device 110 of a novice user 103 performing the process 105. Live feed data 106 can include any data detected, received, or otherwise logged in the process site environment 101 while a user (e.g., novice user 102 or expert user 103) is performing a process 105 and describes conditions at the process site 101. In certain embodiments, live feed data 106 can include image data, video data, audio data, accelerometer data, positioning data (e.g., GPS coordinates), environmental conditions data (e.g., temperature recorded by thermometer, presence of smoke detected by smoke detector), security status data (opened/closed and/or locked/unlocked status of doors and/or windows), computing device operation status (e.g., which application or program is operating, which user interface objects are being selected within an application or program), or other live feed data 106. In certain embodiments, the live feed data 106 further includes data received from one or more cameras, microphone devices, beacon devices, security devices (e.g., smoke detector, door and window monitors), smart appliances (e.g., stoves, refrigerators, etc.), user computing devices (mobile phone, tablet devices, etc.), smartwatches or other wearable devices, or other devices communicatively coupled to the process site computing device 110 and that are able to log live feed data 106. In certain embodiments, the coach module 136 receives the live feed data 106 from the process site computing device 110, preprocesses the live feed data 106, and transmits the processed live feed data 106 to the AI processor module 137. Processing the live feed data 106 can include recording time passage and key spatial, verbal, and visual information from the live feed data 106 which can be used by the AI processor module 137 to predict what actions the novice user 102 is performing with respect to the process 105 as defined by the template 132 associated with the process 105.

During presentation of the instructions 107 via the process site computing device 110, the smart coach computing system 130 can teach using screens, voice/audio, motorized laser pointer, motorized spotlight, smell emitter, haptic feedback, sensors on the process site computing device 110 and/or various devices at the process site 101, etc. Naturally, various devices can be used, including wearables and XR (AR/VR/MR). In some instances, the teaching process is not held in a stationary process site 101 and the process site 101 can include several locations, or even include an area in which the novice user 102 is walking or in a vehicle. During presentation of the instructions 107, the smart coach computing system 130 can teach the novice user 102 using progressive levels of supervision. Initial runs can be slow and highly directed by the smart coach computing system 130; then, as the novice user 102 exhibits more skill (as indicated in the live feed data 106), the smart coach computing system 130 acts as more of an observer than a teacher by modifying the instructions 107 to be less detailed than a previous version. At block 250, the method 200 involves modifying, by the smart coach computing system 130, the instructions 107 for performing the process 105 based on the selected template 132 and the received feed data 106. In some embodiments, implementing block 250 involves implementing sub-blocks 251, 253, 255, and/or 257, as applicable.

At sub-block 251, the method 200 involves detecting a deviation from the instructions 107. For example, the AI processor module 137 applies one or more machine learning models to the live feed data 106 (or to live feed data 106 preprocessed by the coach module 136) classify a current action of the novice user 102. The AI processor module 137 can compare the current action of the user to the instructions 107 specified by the template 132 associated with the process 105 to determine that the novice user 102 has deviated from the instructions 107. In some instances, the AI processor module 137 detects, based on the live feed data 106, that the novice user 102 has deviated from the instructions. In some instances, the AI processor module 137 compares the live feed data 106 or processed live feed data 106 of the novice user 102 against live feed data 106 or processed live feed data 106 of the expert user 103 performing the process 105 to determine the deviation. For example, the process 105 is for baking muffins and the AI processor module 137 compares the novice user's 102 actions, equipment, timing, ingredients used, to the actions, equipment, timing, and ingredients used of the expert user 103 performing the same process 105. For example, the expert user 103 added salt to the dough mixture but the novice user 102 did not add salt and the AI processor module 137 detects that not adding salt is the deviation from the instructions 107. In another example, the expert user 103 preheated an oven and placed a muffin pan in the preheated oven but the novice user 102 simply turned on the oven (without preheating) and placed the muffin pan in the oven that is not yet preheated.

At sub-block 253, the method 200 involves determining whether the deviation results in a risk. In certain examples, the expert user 103, when training the smart coach computing system 130, specifies deviations which result in a risk. For example, a risk could include a safety risk such as not turning off an appliance after use, an improper technique when using a tool, or other safety risk which could harm the safety of the novice user 102 or create a safety issue at the process site 101 such as a fire. Risks could further include risks that negatively impacts a business. For example risks could include forgetting to lock up the process site 101 at the end of the day, eating half of the muffin dough, giving away food without recording under charity, loitering away from a work station, taking smoking breaks near a propane tank, or other risk.

In some instances, a risk is determined based on occurrence of an action or environmental condition and not based on deviation from instructions 107. For example, the smart coach computing system 130 determines a fire risk based on the live feed data 106 including a sounding smoke detector or determines a security risk based on live feed data 106 including a security system status of an open back door.

If the smart coach computing system 130 determines that the deviation from the instructions 107 or that the occurrence of a predetermined event or environmental condition, results in a risk, the method 200 proceeds to sub-block 255. For example, the guardian module 141 accesses a list of risks configured by the expert user 103 during training of the template 132 and identifies a risk, in the list of risks, corresponding to the current action or lack of action of the novice user 102 associated with the deviation from the instructions 107 or corresponding to or the occurrence of a predetermined event or environmental condition determined in sub-block 251. In some instances, risks (e.g. precise actions that must be performed during critical steps) are either inherent in the template 132 or are pointed out by the expert user 103 during the teaching session in which the template 132 is configured.

At sub-block 255, the method 200 involves transmitting, by the smart coach computing system 130, an alert 134 to a user computing device 145. Responsive to determining that the deviation results in a risk, the guardian module 141 transmits a request to the alerts module 142 to send an alert 134 to the user computing device 145 associated with the expert user 103 to notify the expert user 103 of the risk. The alerts module 142 receives the request from the guardian module 141 and sends the alert 134 to the user computing device 145 via a text message, a voice message, an email, a communication via a coach application 146 of the user computing device 145, or other means of communication. The user computing device 145 receives the alert 134 and, in some instances, displays the alert 134. In some instances, the expert user 103 views the alert 134 describing the risk and determines an action to take, for example, calling the novice user 102, returning to the process site 101, or other action. In some instances, the user computing device 145 displays a user interface object that enables the expert user 103 to provide corrective or supplemental instructions by video or voice recording and the expert user 103 records the supplemental instructions. For example, the expert user 103 records himself or herself saying "lower the oven temperature!" or "open a window!" or "place the dough in the refrigerator immediately!" In these instances, the coach computing system 130 (for example, via the learning module 135) receives the supplemental instructions, adds the corrective or supplemental instructions to instructions 107 in the template 132. In these instances, the smart coach computing system 130 is configured to display these corrective or supplemental instructions if the same particular risk occurs again.

From sub-block 255, the method 200 proceeds to sub-block 257. For example, the smart coach computing system 130 retrieves corrective or supplemental instructions retrieved from the template 132. In some instances, the corrective or supplemental instructions are preconfigured in the template 132 during the training phase. The training phase is described in further detail in FIG. 3. In other instances, the smart coach computing system 130 adds the corrective or supplemental instructions the template 132 associated with the process 105 responsive to transmitting an alert 134 to the user computing device 145 and receiving the supplemental or corrective instructions from the user computing device 145.

Returning to sub-block 253, if the smart coach computing system 130 determines that the deviation does not result in a risk, the method 200 proceeds to sub-block 257. For example, the smart coach computing system 130 retrieves corrective or supplemental instructions retrieved from the template 132. In some instances, the corrective or supplemental instructions are preconfigured in the template 132 during the training phase. The training phase is described in further detail in FIG. 3.

At sub-block 257, the method 200 involves transmitting, by the smart coach computing system 130, corrective instructions to the process site computing device 110. For example, the smart coach computing system 130 provides corrective or supplemental instructions retrieved from the template 132 to the process site computing device 110 and the process site computing device 110 displays or otherwise communicates the corrective or supplemental instructions to the novice user 102. In some instances, the novice user 102 views and follows the corrective or supplemental instructions. For example, the corrective instructions instruct the novice user 102 to reduce an oven temperature and the novice user 102 follows the corrective instructions by turning a dial to reduce the heat on the oven. In another example, corrective instructions instruct the novice user 102 to close a back door that was left open and the novice user 102 follows the corrective instructions to closing the back door.

In certain embodiments, during presentation of the instructions 107, the novice user 102 can ask the smart coach computing system 130 for clarifications, repeats, translations, and ad-hoc questions. The novice user 102 can also ask to call the expert user 103 as a lifeline and the smart coach computing system 130 can connect the novice user 102 to the expert user 103 by connecting the process site computing device 110 and the user computing device 110 via a phone call, video call, or other means of dynamic communication. In addition to providing both positive and corrective feedback, the smart coach computing system 130 can send notifications to the expert user 103 (e.g., in some instances, the business owner). This informs the expert user 103 of the novice user's 102 performance and efficacy of the smart coach computing system 130. In some embodiments, the smart coach computing system 130 can automatically improve instructions 107 in process-specific templates 132 based on when it detected that the novice user 102 needed more help and intervention. If needed, the smart coach computing system 130 can ask the expert user 103 to re-record some portions of the instructions 107.

After completion of sub-block 257, the method 200 proceeds from block 250 to block 260.

At block 260, the method 200 involves determining, by the smart coach computing system 130, whether the process 105 is complete. For example, until the process 105 is complete, the smart coach computing system continues to present instructions 107 in accordance with received live feed data 106 and the process specific template 132, as described in blocks 230 and 240, and provides, as necessary, corrective or supplemental instructions responsive to detecting deviations from the instructions 107 or occurrences of predetermined actions or environmental conditions, as described in block 250. The smart coach computing system 130, at some point, determines that the process 105 is complete based on the live feed data 106 and the template 132 specific to the process 105. For example, the final steps in the process 105 are opening the oven, visualizing a golden-brown color of a cake, inserting a toothpick into the cake, determining that the toothpick is clean upon removal, removing the cake pan from the oven, placing the cake pan to cool on a rack, and turning off the oven. The smart coach computing system 130 (for example, the AI processor module 137) determines that these steps in the instructions 107 have been completed and, therefore, that the process 105 is complete, based on examining the live feed data 106.

If the smart coach computing system 130 determines that the process 105 is not complete, the method 200 returns to block 230. For example, the smart coach computing system 130 determines, based on reviewing the live feed data 106, that uncompleted steps in the instructions 107 and/or uncompleted corrective or supplemental instructions 107 remain.

Returning to block 260, if the smart coach computing system 130 determines that the process 105 is complete, the method 200 proceeds to block 270. For example, the smart coach computing system 130 determines, based on reviewing the live feed data 106, that all instructions 107 have been completed by the novice user 102.

At block 270, the method 200 involves determining, by the smart coach computing system 130, statistics 133 of the process 105 based on the live feed data 106. For example, the statistics module 139 extracts, from the live feed data 106, video data, image data, or other data summarizing statistics 133 comprising a result of the process 105. For example, the process 105 is for baking muffins and the result of the process 105 is an image of the baked muffins cooling on a rack. In certain examples, the statistics module 139 logs statistics 133 associated with the process 105, for example, a time elapsed since the beginning of the process 105, a completion time for each step in the instructions 107, a summary of deviations from the instructions and/or alerts 134, or other information determined based on the live feed data 106. In some embodiments, determining statistics 133 includes retrieving data from a review system and determining statistics 133 based on review data. For example, the smart coach computing system 130 can scan customer reviews on review websites to infer sentiment on the novice user's 102 finished product (generated via the process 105) or of the novice user's 102 conduct of the process 105. If customers post pictures, then the system can also visually compare the finished product to the gold standard that was set by the expert user 103 during training of the process-specific template 132. In some instances, in accordance with settings and with notice to and permission of customers, the smart coach computing system 130 can monitor customer reactions while in the place of business (ex. audiovisual: smiling/frowning, gushing/complaining) to infer the level of customer satisfaction with the novice user's 102 finished product. In certain embodiments, the smart coach computing system 130 can scan notes that another employee made about the novice user's 102 performance of the process 105. For example, if the process 105 is a patient encounter, electronic health record system records or old-school paper charts provide statistics 133 as to whether the novice user 102 performed the process 105 up to par with the gold standard that was set by the expert user 103 when training the process-specific template 132.

At block 280, the method 200 involves updating, by the smart coach computing system 130, the template 132 based on the result of the process 105 determined in block 270. In certain examples, the AI processor module 137 edits the process-specific template 132 based on the statistics 133. In some instances, the AI processor module 137 reorders, removes, adds, replaces, consolidates, separates, or otherwise modifies one or more steps of the instructions 107 in the template 132 associated with the process 105 based on the statistics 133. For example, the AI processor module 137 modifies the steps in the template 132 to attempt to improve one or more statistics 133 the next time the process 105 is performed. For example, the steps are modified to attempt to decrease an overall time for the process 105 or reduce a number of deviations from the instructions 107. In some instances, modifying the steps of the instructions includes transmitting a request to the expert user 103 (e.g., via the user computing device 145 or via the process site computing device 110) for supplemental instructions 107. For example, the AI processor module 137 determines that the novice user 102 had difficulty with one of the steps in the instructions, for example, locking a door. The AI processor module 137 transmits a request for the expert user 103 to provide further input, receives the further input, and integrates the further input into the instructions 107. The further input could include a voice recording, video recording, or other input provided by the expert user 103 that further clarifies or explains the difficult step in the instructions 107 to attempt to reduce future difficulties of novice users 102 in performing the difficult step. In another example, the system can also search the web or call external APIs in order to augment the expert's instructions. For example, when the expert uses jargon, the system can get more info so that it can demystify to the novice if needed". Apart from this, the "optimization" of the instructions could be done by the system by comparing it to the template of this particular task, or to templates of similar tasks (matching can be done using tags of the templates or comparison of their names & descriptions).

In some instances, the smart coach computing system 130 can also modify the instructions 107 based on feedback by its users. For example, a novice user 102 may say that a the video for a certain step needs to be zoomed in more, or that the expert user 103 used jargon or unfamiliar slang. Translations may benefit from this, as in cases where words are different per region (ex "carro" vs "coche" as the Spanish word for car). In certain examples, the smart coach computing system 130 can produce metrics and graphs to show results across novice users 102, per step, in the instructions 107 and can modify one or more of the steps of the instructions 107 based on these aggregated statistics across multiple novice users 102.

FIG. 3 depicts an example of a process 300 for generating, by a smart coach computing system 130, a process-specific template 132 based on live feed data 106 of an expert user 103 performing a process 105, in accordance with certain embodiments described herein. One or more computing devices (e.g., the smart coach computing system 130) implement operations depicted in FIG. 3. For illustrative purposes, the process 300 is described with reference to certain examples depicted in the figures. Other implementations, however, are possible.

At block 310, the method 300 involves receiving, by smart coach computing system 130, a request to create a new template 132. For example, the expert user 103 is a store owner and the expert user 103 desires to generate a new template 132 associated with a process 105 which the expert user 103 wishes to delegate to a novice user 103 (e.g., an employee).

At block 320, the method 300 involves receiving, by the smart coach computing system 130 from the process site computing device 110, live feed data 106 of an expert user 103 performing a process 105. For example, the learner module 135, responsive to generating the new template, requests and receives live feed data 106 from the process site computing device 110. For example, the process 105 is preparing and baking muffins and the process site computing device 110 records and transmits live feed data 106 of the expert user 103 baking muffins to the learner module 135.

The demonstration of the process 105 by the expert user 103 generates live feed data 106 logged by the process site computing device 110. This can be done via cameras, sensors, etc of the process site computing device 110 and/or by computing devices at the process site 101 which are communicatively coupled to the process site computing device 110 and/or to the smart coach computing system 130. The expert user 103 can narrate as they perform the task, as they would when teaching a fellow human. The smart coach computing system 130 can alert the expert user 103 if it needs a repeat or elaboration on the specific step being demonstrated. The smart coach computing system 130 can automatically predict, e.g., via applying one or more machine learning models to the live feed data 106, when to zoom in or shoot from concurrent angles, such as when the expert indicates emphasis such as "you really gotta do this carefully." In certain embodiments, the expert user 103 can indicate how much tolerance (e.g., margin of error) is allowed per step. The expert user 103 can also say what always has to be done or never done. The expert user 103 can provide cues on how to manage risk. For example, if certain steps require extra care or if the step requires the help of a colleague (e.g. the novice user 102 will need help carrying a heavy object). After the recording of the live feed data 106 by the process site computing device 110, the expert user 103, in some embodiments, can review and verify what the smart coach computing system 130 has captured. The expert user 103 can also ask the smart coach computing system 130 to perform a dry run of presenting the instructions 107 in a tutorial and provide feedback on the presentation of the instructions 107. In certain embodiments, the smart coach computing system 130 can also search the web or call external application program interfaces (APIs) in order to augment the expert user's 103 demonstration of the process 105. For example, when the expert user 103 uses jargon, the smart coach computing system 130 can get more information so that it can demystify to the novice user 102 if needed.

At block 330, the method 300 involves generating, by the smart coach computing system 130, the template 132 based on the received live feed data 106. In certain embodiments, the AI processor module 137 analyzes the live feed data 106 and generates instructions 107 based on the live feed data 106. In certain examples, the AI processor module 137 performs a language analysis of the live feed data 106 and detects spoken keywords that indicate breaks between steps, for example, "next," "now," "if," "when," etc. In certain examples, the expert user 103 defines steps in the instructions 107 by interacting with the coach application 119 of the process site computing device 110. For example, the expert user 103 clicks a user interface 111 object or otherwise inputs an instruction to generate a new step in the instructions and then performs the step before inputting an instruction to generate a subsequent new step, etc. The smart coach computing system 130 receives the inputs of the expert user 103 and generates the instructions 107 in accordance with the received inputs of the expert user 103. In certain embodiments, the live feed data 106 indicates that the expert user 103 has made a mistake and has corrected the mistake. For example, the expert user 103 performs an action and exclaims "see how I did this wrong? Here is what you need to do to fix this!" Detecting the language cues that indicate an occurrence of a mistake and correction of the mistake, the AI processor module 137 includes a corrective step in the instructions 107 that instructs a novice user 102 how to correct this mistake if it occurs during performance of the process 105.

At block 340, the method 300 involves storing, by the smart coach computing system 130, the template 132. For example, the templates module 136 transmits the template 132 including the instructions 107 to the storage module 142, which stores the template 132 in the data storage unit 131.

Examples of Applications of the Smart Coach Computing System—Bakery

In an example, a bakery is an organization where humans have to perform processes in a certain way or else risk the company's failure in meeting its goals. A process site 101 comprising a bakery is popular with kids because the cupcakes generated via a baking process 105 have animal faces on them. As such, the main customer base (kids) are more interested in the appearance of the product than the taste. Accordingly, instructions 107 generated via the smart coach computing system 130 in this example can be flexible as long as the taste conforms to a minimum standard and the appearance is satisfactory to the customers. However, the decoration steps of the process 105 have to be done in a precise and consistent way. This is in line with the brand image of the bakery— the product has to match the beautiful pictures that the bakery posts on social media. Accordingly, an expert user 103 of the bakery opts to start with generic templates 132 including instructions 107 for making cupcakes in vanilla and chocolate flavors, as well as basics of icing/decoration. The expert user 103 performs the process 105 by pointing to where the pots, spatulas, etc are kept. The expert can also explain the controls on the oven, or if the oven has quirks ("you have to jiggle the handle to open it"). That will enable the smart coach computing system 130, via the final instructions 107, to point those out to the novice user 103 later. The smart coach computing system 130 collects live feed data 106 of the expert user 103 performing and explaining the process 105. Live feed data 106 can include sensor data detected by one or more computing devices communicatively coupled to the process site computing device 110. For example, a temperature sensor in the oven can be used to augment the expert user's 103 instructions. Sensors could also be particularly useful if the expert user 103 tends to go by feel ("use a bit of salt"—a volume or weight sensor will get a precise reading). Also, sensors can be used to note conditions that are taken for granted— for example, the expert may be teaching from a tropical location—sensor devices can measure temperature and humidity, so that adjustments can be made by the smart coach computing system 130 when the novice user 102 is in a cold area. During steps that require extra care (such as drawing the face of a panda on the cupcake), the expert user 103 can ask the smart coach computing system 130 to create precise instructions. The smart coach computing system 130 can then activate precise measuring as it records live feed data 106.

In this example, during presentation of the instructions 107 associated with the process-specific template 132, the smart coach computing system 130 can output audio instructions such as "get the spatula, which is the second item from the right", or "look where I'm pointing this spotlight/laser". The smart coach computing system 130 knows what a spatula looks like (or knows the special spatula that the expert had pointed out earlier)—so the system can locate it within the live feed data 106 (e.g., within a video of the process site 101) out no matter where it is at the process site 101. For example, responsive to determining, based on the live feed data 106, that the novice user 102 has reached for the wrong utensil, the smart coach computing system 130 can output an audio output via the process site computing device 110 that says "no, you picked up a spoon, not a spatula." Other examples of interactive instructions 107 could include "pour more . . . more . . . ok stop," or "turn down the dial on the oven when it smells like this" (at which point the system emits a stored smell). In this example, smart coach computing system 130 can evaluate whether the finished product is fit for sale (using cameras, sensors, etc).

Examples of Applications of the Smart Coach Computing System—Specialty Medical Office In an example, a medical office is an organization where humans have to perform processes in a certain way or else risk the company's failure in meeting its goals. For example, a process site 101 comprising specialty medical office has a thriving infusion department. In this specialty medical office, the expensive medications are purchased up front (could cost thousands of $ per dose) and are stored in a locked refrigerator at the process site 101. The medications must be carefully mixed on the day of each patient's appointment because once the medicine bottles are opened, they become perishable and must be used within the day. In this specialty medical office, the medicines are infused into the patient over several hours under the care of a specialist nurse and with doctor nearby. Afterwards, the specialty medical office bills the insurance companies, hoping that the reimbursements at least cover the earlier up-front cost. Accordingly, an expert user 103 (for example, a medical office manager) starts with a basic/generic template 132 for mixing medications that is already included with the smart coach computing system 130. During live demonstration of the process 105 by the expert user 103 to generate instructions 107 for the template, the expert user 103 can demonstrate specific steps such as cautioning that the patient's appointment must be confirmed before the medicine bottles are opened, demonstrating precise hand motion and repetitions by which the medications are mixed, warning of the consequences if steps are missed or incorrectly performed, and giving instructions to address contingencies. For example, "if the patient doesn't show up, have the front office call other patients to ask if they want to come in today" (or else the medications go to waste). In this example, during presentation of the instructions 107 associated with the process-specific template 132, when the novice user 102 is stirring the medications, the smart coach computing system 130 can use sensors on a wearable device (e.g., smartwatch) to give positive or corrective feedback to the novice user 102. For example, the smartwatch may buzz/vibrate if the novice user 102 is using lazy stirring motions.

Examples of Computing Environments for Implementing Certain Embodiments

Figure 4:
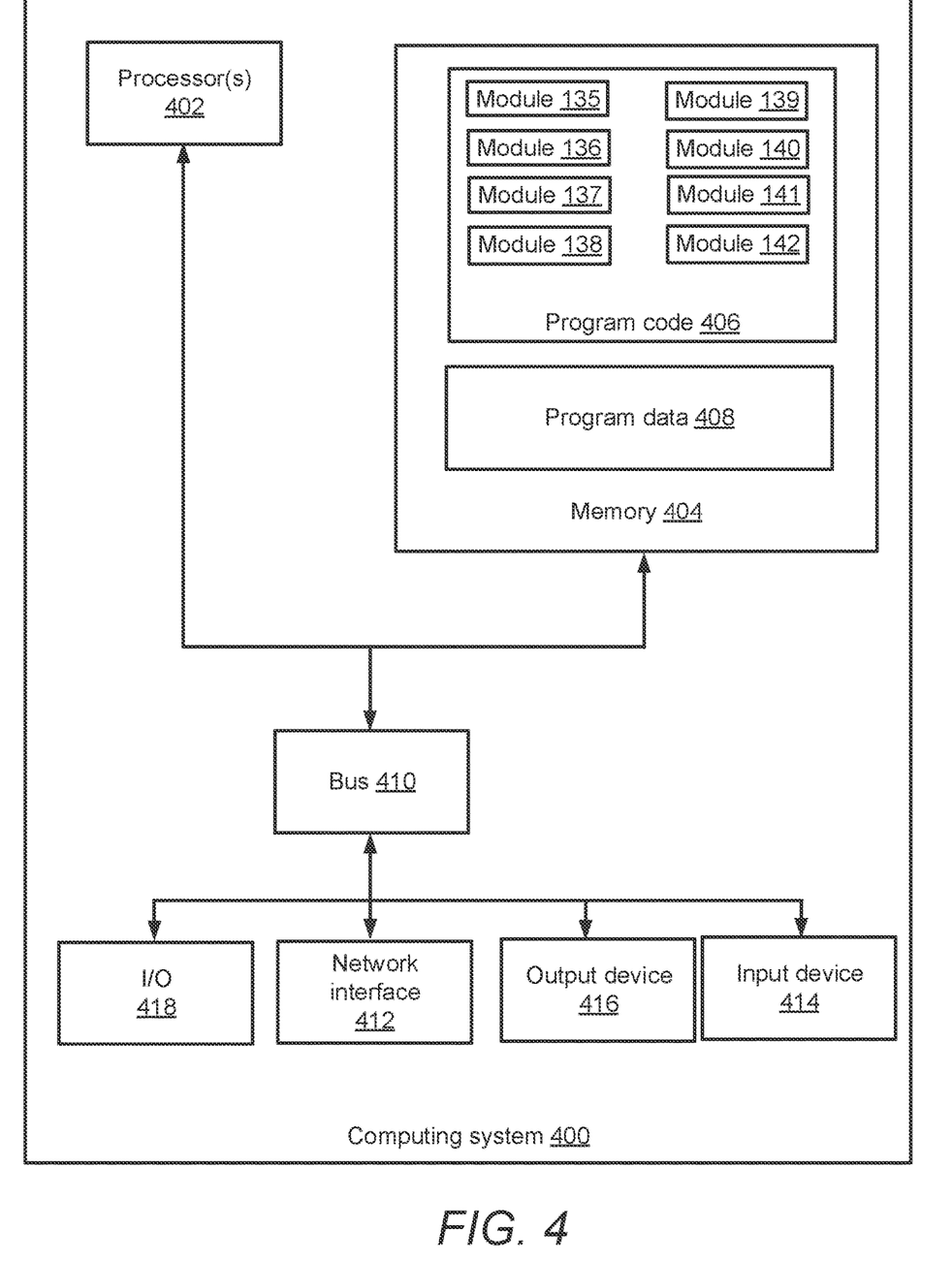
FIG. 4 depicts an example of a computing system that performs certain operations described herein, according to certain embodiments described in the present disclosure.

Any suitable computer system or group of computer systems can be used for performing the operations described herein. For example, FIG. 4 depicts an example of a computer system 400. The depicted example of the computer system 400 includes a processor 402 communicatively coupled to one or more memory devices 404. The processor 402 executes computer-executable program code stored in a memory device 404, accesses information stored in the memory device 404, or both. Examples of the processor 402 include a microprocessor, an application-specific integrated circuit ("ASIC"), a field-programmable gate array ("FPGA"), or any other suitable processing device. The processor 402 can include any number of processing devices, including a single processing device.

The memory device 404 includes any suitable non-transitory computer-readable medium for storing program code 406, program data 408, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the memory device 1104 can be volatile memory, non-volatile memory, or a combination thereof.

The computer system 400 executes program code 406 that configures the processor 402 to perform one or more of the operations described herein. Examples of the program code 406 include, in various embodiments, the modules 135, 136, 137, 138, 139, 140, 141, and 142 of FIG. 1, which may include any other suitable systems or subsystems that perform one or more operations described herein (e.g., one or more neural networks, encoders, attention propagation subsystem and segmentation subsystem). The program code 406 may be resident in the memory device 504 or any suitable computer-readable medium and may be executed by the processor 402 or any other suitable processor.

The processor 402 is an integrated circuit device that can execute the program code 406. The program code 406 can be for executing an operating system, an application system or subsystem, or both. When executed by the processor 402, the instructions cause the processor 402 to perform operations of the program code 406. When being executed by the processor 402, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory devices 404 store the program data 408 that includes one or more datasets described herein. In some embodiments, one or more of data sets are stored in the same memory device (e.g., one of the memory devices 404). In additional or alternative embodiments, one or more of the programs, data sets, models, and functions described herein are stored in different memory devices 404 accessible via a data network. One or more buses 410 are also included in the computer system 400. The buses 410 communicatively couple one or more components of a respective one of the computer system 400.

In some embodiments, the computer system 400 also includes a network interface device 412. The network interface device 412 includes any device or group of devices suitable for establishing a wired or wireless data connection to one or more data networks. Non-limiting examples of the network interface device 412 include an Ethernet network adapter, a modem, and/or the like. The computer system 400 is able to communicate with one or more other computing devices via a data network using the network interface device 412.

The computer system 400 may also include a number of external or internal devices, an input device 414, a presentation device 416, or other input or output devices. For example, the computer system 400 is shown with one or more input/output ("I/O") interfaces 418. An I/O interface 418 can receive input from input devices or provide output to output devices. An input device 414 can include any device or group of devices suitable for receiving visual, auditory, or other suitable input that controls or affects the operations of the processor 402. Non-limiting examples of the input device 414 include a touchscreen, a mouse, a keyboard, a microphone, a separate mobile computing device, etc. A presentation device 416 can include any device or group of devices suitable for providing visual, auditory, or other suitable sensory output. Non-limiting examples of the presentation device 416 include a touchscreen, a monitor, a speaker, a separate mobile computing device, etc.

Although FIG. 4 depicts the input device 414 and the presentation device 416 as being local to the computer system 400, other implementations are possible. For instance, in some embodiments, one or more of the input device 414 and the presentation device 416 can include a remote client-computing device that communicates with computing system 400 via the network interface device 412 using one or more data networks described herein.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computer system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A computer-implemented method in which one or more processing devices of a smart coach computing system performs operations comprising:

receiving, from a process site computing device, live feed data of a first user performing a process;

retrieving a template associated with the process, the template comprising instructions, wherein the instructions are generated using a machine learning model trained by live feed video data of an expert user performing the process;

presenting, via the process site computing device, the instructions in a stepwise manner based on determining, from the live feed data of the first user, completion of each step of the instructions;

comparing, the live feed data of the first user with the live feed video data of the expert user to determine a deviation in the instructions;

determining that the deviation in the instructions results in a risk;

upon determining that the deviation in the instructions results in a risk, generating a notification alert for presentation to the expert user;

upon determining, based on the received live feed data of the first user, that the process is complete, determining one or more statistics from the live feed data of the first user, the one or more statistics comprising at least a total time elapsed to perform one or more particular steps of the instructions; and updating, using the machine learning model, the instructions in the template to optimize the one or more determined statistics, wherein optimizing the one or more determined statistics comprises minimizing a predicted total time elapsed to perform the one or more particular steps of the process.

2. The computer-implemented method of claim 1, wherein the live feed data of the first user comprises one or more of: image data, video data, audio data, accelerometer data, positioning data, environmental conditions data, security status data, or computing device operation status.

3. The computer-implemented method of claim 1, wherein determining the one or more statistics further comprises determining one or more of (A) a number of deviations from the instructions, (B) a total time elapsed to complete all steps of the instructions, or (C) an image of a final result of the process, wherein updating the instructions comprises one or more of: removing, adding, reordering, combining, or separating one or more of the instructions.

4. The computer-implemented method of claim 1, wherein generating the instructions includes generating corrective instructions for presentation when determining the deviation from the instructions results in a risk.

5. The computer-implemented method of claim 4, wherein presenting the corrective instructions comprises:
   extracting, from the template, the corrective instruction; and
   presenting, using the process site computing device, the corrective instruction.

6. The computer-implemented method of claim 1, further comprising detecting, by the smart coach computing system based on the live feed data of the first user, that a novice user is performing the process, wherein the template is retrieved responsive to the detection.

7. A smart coach computing system, comprising:
   processing hardware; and
   a non-transitory computer-readable medium communicatively coupled to the processing hardware, wherein the non-transitory computer-readable medium comprises computer-readable program instructions that, when executed by the processing hardware, cause the system to:
      receive, from a process site computing device, live feed data of a first user performing a process
      retrieve a template associated with the process, the template comprising instructions, wherein the instructions are generated using a machine learning model trained by live feed video data of an expert user performing the process;
      present, via the process site computing device, the instructions in a stepwise manner based on determining, from the live feed data of the first user, completion of steps of the instructions;
      compare, the live feed data of the first user with the live feed video data of the expert user to determine a deviation in the instructions;
      determine that the deviation in the instructions results in a risk;
      upon determining that the deviation in the instructions results in a risk, generate a notification alert for presentation to the expert user;
      upon determining, based on the received live feed data of the first user, that the process is complete, determining one or more statistics from the live feed data of the first user, the one or more statistics comprising at least a total time elapsed to perform one or more particular steps of the instructions; and
      update, using the machine learning model, the instructions in the template to optimize the one or more determined statistics, wherein optimizing the one or more determined statistics comprises minimizing a predicted total time elapsed to perform the one or more particular steps of the process.

8. The system of claim 7, wherein the live feed data of the first user comprises one or more of: image data, video data, audio data, accelerometer data, positioning data, environmental conditions data, security status data, or computing device operation status.

9. The system of claim 7, wherein determining the one or more statistics further comprises determining one or more of (A) a number of deviations from the instructions, (B) a total time elapsed to complete all steps of the instructions, or (C) an image of a final result of the process, wherein updating the instructions comprises one or more of: removing, adding, reordering, combining, or separating one or more of the instructions.

10. The system of claim 7, wherein generating the instructions includes generating corrective instructions for presentation when determining the deviation from the instructions results in a risk.

11. The system of claim 10, wherein presenting the corrective instructions comprises:
   extracting, from the template, the corrective instruction; and
   presenting, using the process site computing device, the corrective instruction.

12. The system of claim 7, wherein the non-transitory computer readable medium further comprises program instructions that, when executed by the processing hardware, cause the system to detect, based on the live feed data of the first user, that a novice user is performing the process, wherein the template is retrieved responsive to the detection.

13. A non-transitory computer-readable medium having program code that is stored thereon, the program code executable by one or more processing devices for performing operations comprising:
   receiving, from a process site computing device, live feed data of a first user performing a process;
   retrieving a template associated with the process, the template comprising instructions, wherein the instructions are generated using a machine learning model trained by live feed video data of an expert user performing the process;
   presenting, via the process site computing device, the instructions in a stepwise manner based on determining, from the live feed data of the first user, completion of steps of the instructions;

comparing, the live feed data of the first user with the live feed video data of the expert user to determine a deviation in the instructions;
determining that the deviation in the instructions results in a risk;
upon determining that the deviation in the instructions results in a risk, generating a notification alert for presentation to the expert user
upon determining, based on the received live feed data of the first user, that the process is complete, determining one or more statistics from the live feed data of the first user, the one or more statistics comprising at least a total time elapsed to perform one or more particular steps of the instructions; and
updating, using the machine learning model, the instructions in the template to optimize the one or more determined statistics, wherein optimizing the one or more determined statistics comprises minimizing a predicted total time elapsed to perform the one or more particular steps of the process.

14. The non-transitory computer-readable medium of claim 13, wherein the live feed data of the first user comprises one or more of image data, video data, audio data, accelerometer data, positioning data, environmental conditions data, security status data, computing device operation status.

15. The non-transitory computer-readable medium of claim 13, wherein determining the one or more statistics further comprises determining one or more of (A) a number of deviations from the instructions, (B) a total time elapsed to complete all steps of the instructions, or (C) an image of a final result of the process wherein updating the instructions comprises one or more of: removing, adding, reordering, combining, or separating one or more of the instructions.

16. The non-transitory computer-readable medium of claim 13, wherein generating the instructions includes generating corrective instructions for presentation when determining the deviation from the instructions results in a risk.

17. The non-transitory computer-readable medium of claim 16, wherein presenting the corrective instructions comprises:
extracting, from the template, the corrective instruction; and
presenting, using the process site computing device, the corrective instruction.

* * * * *